C. N. SRADER.
REPAIR HUB AND WHEEL PULLER.
APPLICATION FILED SEPT. 16, 1919.
1,346,857.
Patented July 20, 1920.
2 SHEETS—SHEET 1.
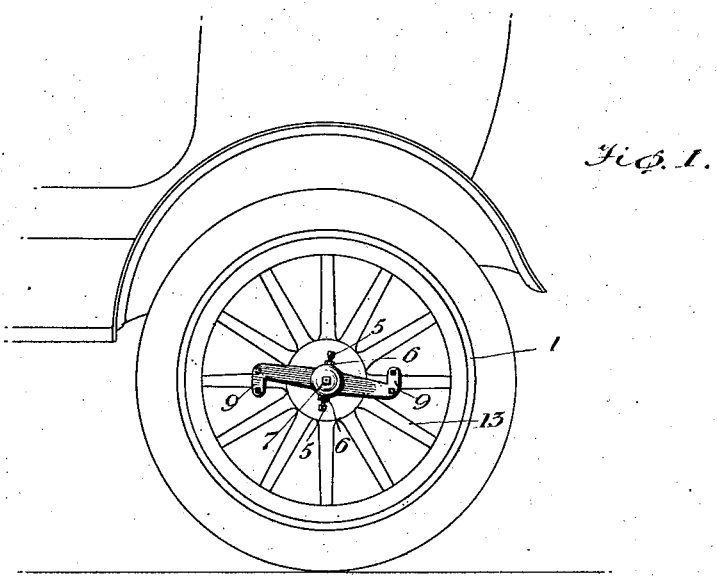
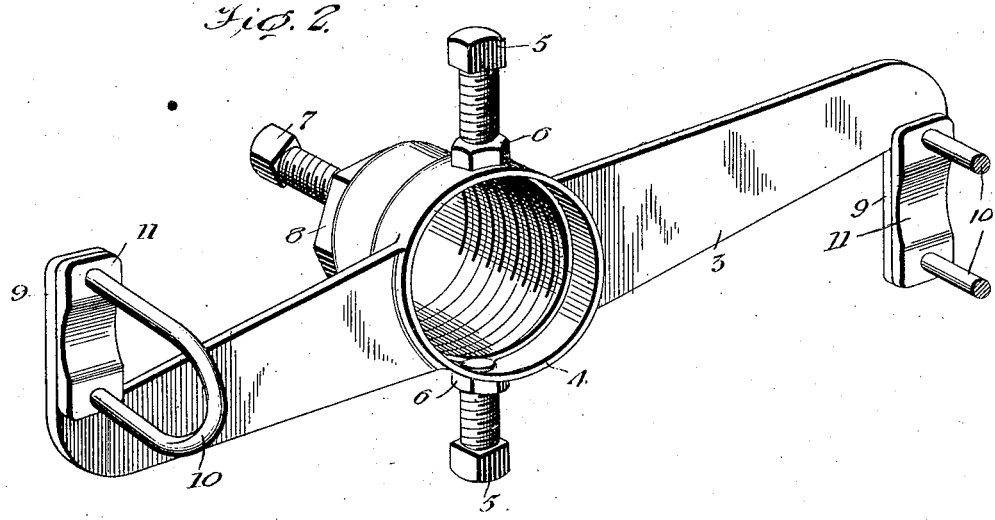

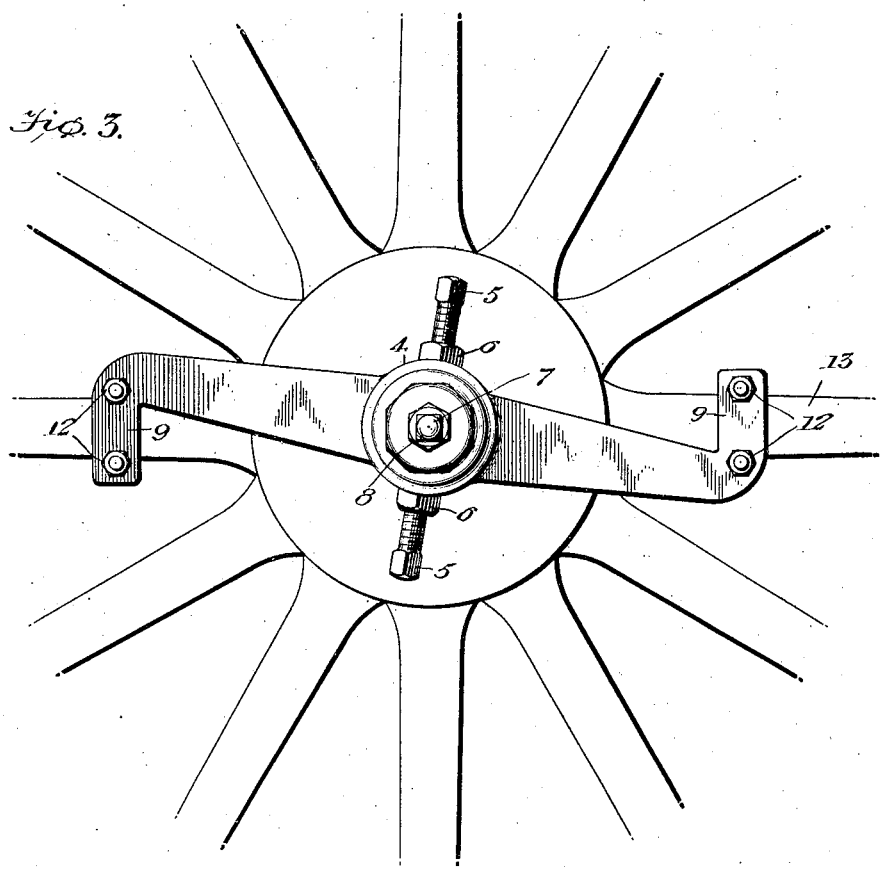
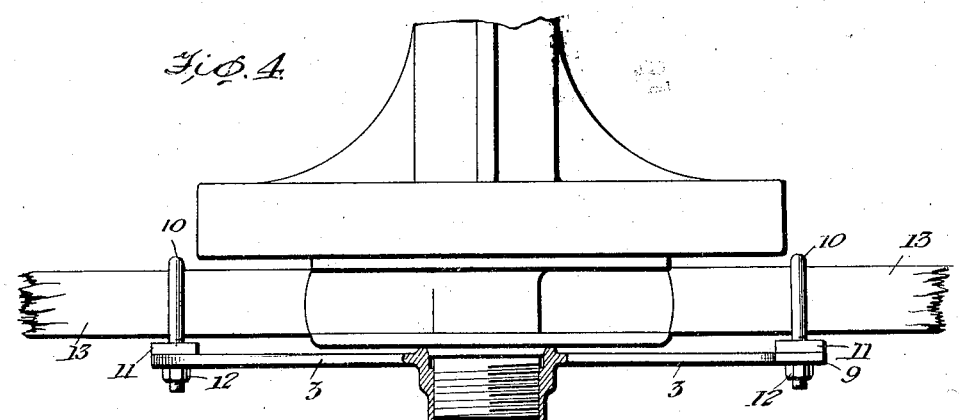

UNITED STATES PATENT OFFICE.

CHARLES NOAH SRADER, OF CANTON, OKLAHOMA.

REPAIR-HUB AND WHEEL-PULLER.

1,346,857.   Specification of Letters Patent.   Patented July 20, 1920.

Application filed September 16, 1919. Serial No. 324,074.

*To all whom it may concern:*

Be it known that I, CHARLES N. SRADER, a citizen of the United States, and a resident of Canton, in the county of Blaine and State of Oklahoma, have made certain new and useful Improvements in Repair-Hubs and Wheel-Pullers, of which the following is a specification.

My invention is an improvement in repair hubs and wheel pullers, and has for its object to provide a device of the character specified especially adapted for use in repairing broken Ford rear hubs, for permitting the car to be used after the hub is broken for a limited time, as for instance to be taken to the repair shop.

In the drawings:—

Figure 1 is a front view of the rear wheel of a motor vehicle with the repair hub in place;

Fig. 2 is a perspective view of the hub looking from the inner side;

Fig. 3 is a side view of the hub in place on the wheel;

Fig. 4 is a top plan view with parts in section.

The present embodiment of my invention is shown in connection with the rear wheel 1 of a motor vehicle indicated at 2. The improvement comprises a plate or bar 3 having at the center thereof a transversely extending cap 4, the said cap being internally threaded as shown and open at one side of the plate, the other end being closed. Set screws 5 are threaded through the cap, extending radially thereof. Each screw has a lock nut 6 for holding it in adjusted position. Another set screw 7 is threaded through the closed end of the cap, and this screw also has a lock nut, and the closed end of the cap has a polygonal portion 8 for engagement by a wrench.

At each end the plate 3 has a lateral integral extension 9 and U-shaped clips 10 are connected with these extensions, each clip having its arms passed through openings in the extension and in a bearing plate 11 arranged on the inner face of the extension and the arms are engaged by nuts 12 outside of the plate 3. As shown in Fig. 2 these plates 11 are recessed transversely on their inner faces to fit a spoke 13 of the wheel, upon which the device is to be used.

In use, when a hub is broken, the usual hub cap is removed, and cap 4 is placed in its stead. The plate 3 is arranged with respect to a pair of oppositely disposed spokes so that the clips 10 will engage said spoke, and the clips are engaged with the spokes and connected to the plate by means of the nuts 12. The set screws 5 are now tightened and held by the lock nuts 6, after which the set screw 7 is engaged with the end of the spindle.

With the improvement in place it will be obvious that the vehicle may be safely driven a reasonable distance, as for instance, to a repair shop for repairs.

I claim:—

A hub repair device comprising a cylindrical cap having an angular portion formed for engagement by a wrench whereby it may be turned, the cap being internally threaded for engagement upon the threaded end of a hub, clamping screws passing through the sides of the cap and engaging the hub, diametrically opposite arms extending from said cap and terminating in laterally offset portions, and detachable clips carried by said offset portions and engageable about spokes of a wheel.

CHARLES NOAH SRADER.